United States Patent
Fryking et al.

(10) Patent No.: US 11,412,448 B2
(45) Date of Patent: Aug. 9, 2022

(54) REMOTE WAKE-UP OF A DEVICE BEHIND A NAT

(71) Applicant: Telefonaktiebolaget LM Ericsson (publ), Stockholm (SE)

(72) Inventors: Per Fryking, Lund (SE); Jens Jansson, Lund (SE); Martin Klitte, Malmo (SE); Sven Wastlund, Lomma (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 52 days.

(21) Appl. No.: 16/969,113

(22) PCT Filed: Feb. 13, 2018

(86) PCT No.: PCT/EP2018/053541
§ 371 (c)(1),
(2) Date: Aug. 11, 2020

(87) PCT Pub. No.: WO2019/158184
PCT Pub. Date: Aug. 22, 2019

(65) Prior Publication Data
US 2021/0037461 A1    Feb. 4, 2021

(51) Int. Cl.
*H04W 52/02* (2009.01)
*H04W 76/11* (2018.01)
(Continued)

(52) U.S. Cl.
CPC ....... *H04W 52/0206* (2013.01); *H04L 61/256* (2013.01); *H04L 61/2514* (2013.01);
(Continued)

(58) Field of Classification Search
CPC ........... H04W 52/0206; H04W 68/005; H04W 76/11; H04L 61/2514; H04L 61/256; H04L 61/305; H04L 12/12
See application file for complete search history.

(56) References Cited

U.S. PATENT DOCUMENTS

| 2005/0058143 | A1 | 3/2005 | Kikuchi et al. |
| 2006/0224681 | A1* | 10/2006 | Wurster ................ H04L 51/14 709/206 |

(Continued)

FOREIGN PATENT DOCUMENTS

EP    1578086 A1    9/2005

OTHER PUBLICATIONS

PCT International Search Report, dated Oct. 12, 2018, in connection with International Application No. PCT/EP2018/053541, all pages.

(Continued)

*Primary Examiner* — Yaotang Wang
(74) *Attorney, Agent, or Firm* — Leffler Intellectual Property Law, PLLC

(57) ABSTRACT

Methods of a first communication device and of a server are disclosed, for enabling inbound Internet protocol (IP) traffic to the first communication device. The server is associated with an operator network and with a wake-up server identity. The first communication device has an operator specific device identity related to the operator network and is subject to network address translation (NAT). A wake-up registration request is transmitted by the first communication device to the server and the server provides a wake-up identifier to the first communication device for triggering a wake-up action for enabling the inbound IP traffic. The wake-up identifier comprises at least a first part indicative of a wake-up device identity and a second part indicative of the wake-up server identity.

23 Claims, 6 Drawing Sheets

(51) Int. Cl.
*H04L 61/2514* (2022.01)
*H04L 61/256* (2022.01)
*H04L 101/35* (2022.01)
*H04W 68/00* (2009.01)

(52) U.S. Cl.
CPC ......... *H04L 61/305* (2013.01); *H04W 68/005* (2013.01); *H04W 76/11* (2018.02)

(56) References Cited

U.S. PATENT DOCUMENTS

| 2009/0210519 | A1  | 8/2009  | Zill et al. |             |
|--------------|-----|---------|-------------|-------------|
| 2011/0302278 | A1  | 12/2011 | Shim        |             |
| 2012/0230337 | A1* | 9/2012  | Lee         | H04W 4/70   |
|              |     |         |             | 370/392     |
| 2013/0260755 | A1* | 10/2013 | Seo         | H04W 52/0206 |
|              |     |         |             | 455/435.1   |
| 2018/0027490 | A1* | 1/2018  | Liu         | H04B 7/18532 |
|              |     |         |             | 370/311     |

OTHER PUBLICATIONS

PCT Written Opinion, dated Oct. 12, 2018, in connection with International Application No. PCT/EP2018/053541, all pages.
Unknown, "1E web WakeUp—Users CAN wake computers from Anywhere!", Dec. 18, 2014, https://www.1e.com/news/insights/blogs/2014/12/18/1e-web-wakeup-users-can-wake-computers-anywhere/, 9 pages.
Yatritrivedi, "What Is Wake-on-LAN, and How Do I Enable it?", Jul. 28, 2017, How-To Geek, https://www.howtogeek.com/70374/how-to-geek-explains-what-is-wake-on-lan-and-how-do-i-enable-it/, 9 pages.
Oma Open Mobile Alliance, Lightweight Machine to Machine Technical Specification, Approved Version 1.0, Feb. 8, 2017, 138 pages.
P. Srisuresh et al., "State of Peer-to-Peer (P2P) Communication across Network Address Translators (NATs)", Mar. 2008, Network Working Group, Request for Comments: 5128, 32 pages.

* cited by examiner

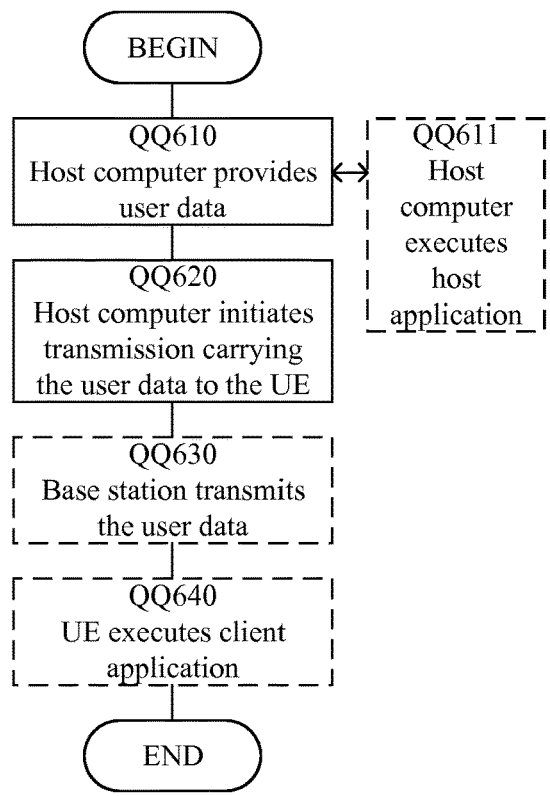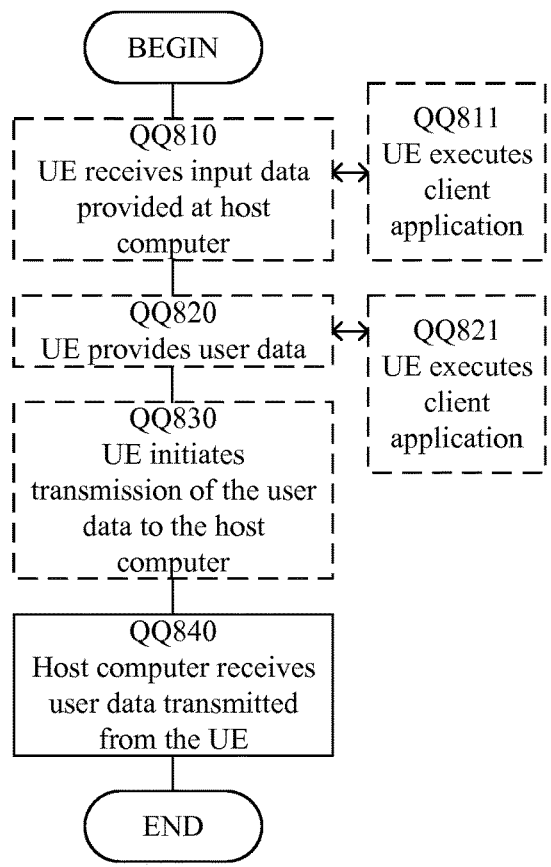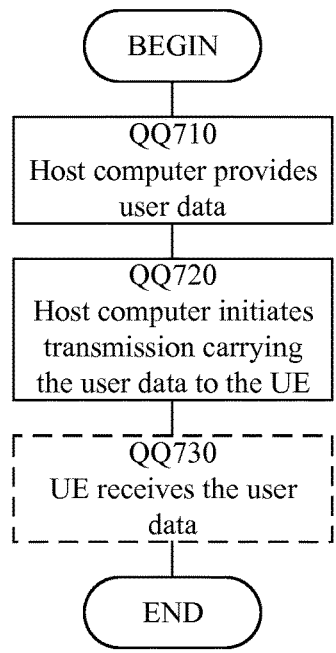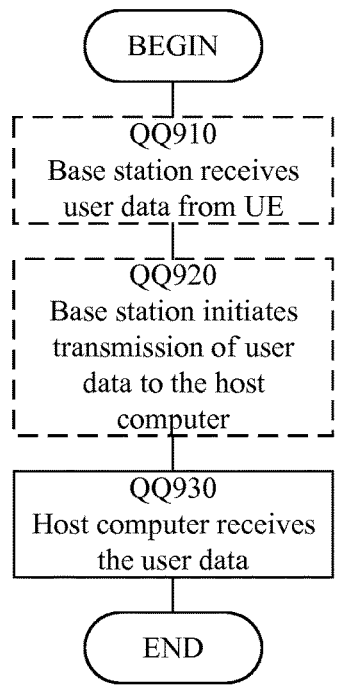
FIG. 12
FIG. 14
FIG. 13
FIG. 15

REMOTE WAKE-UP OF A DEVICE BEHIND A NAT

TECHNICAL FIELD

The present disclosure relates generally to the field of IP communication. More particularly, it relates to inbound IP traffic to a device subject to network address translation (NAT).

BACKGROUND

A communication device—also denoted herein as first communication device, device, or user equipment (UE)—configured for Internet protocol (IP) connections can, for various reasons, be assigned a local IP address that is not globally addressable. Such a situation can for example be explained as the device being subject to a Network Address Translation (NAT).

Whenever an outgoing connection is established from the device, a new entry is created in a NAT table that enables translation between the local IP address domain and the global IP address domain.

One example scenario with NAT is an ordinary user router maintaining one single public IP address, wherein devices "behind" the router are typically assigned local IP address (i.e. 192.168.0.X). The router maintains a table comprising active IP connections and translates the local and global IP address domains for all outgoing traffic.

Use of NAT increases the number of devices that may be accommodated based on the global IP address domain. However, inbound IP traffic to devices subject to a NAT is blocked since their local IP address is not generally known.

To open up a NAT for inbound traffic, a static port forwarding rule may typically be configured in the router handling the NAT, redirecting inbound traffic to the appropriate local IP address. However, in many situations, it is not feasible to use static port forwarding. One such situation is peer-to-peer connection for an online game, wherein setting up a static port forwarding rule would allow only one client to play the game. Hence, other techniques are needed for NAT traversal of inbound traffic.

One approach comprises the device connecting to an external server and maintaining this connection through "keep alive" messaging. Such messaging typically comprises a "heartbeat" signal transmitted periodically, e.g. a packet sent with some periodicity. Another device that also maintains a connection to the same server can then communicate with device through the server.

Another approach termed hole punching may be used if two devices "behind" two different NAT:s are to communicate directly with each other. In this approach, each of the devices connects to an external server and sends its internal IP/port-tuple to the server. The server stores this information together with the corresponding global IP/port-tuple. The connections between the devices and the server are maintained through keep alive messaging. When one device wants to connect to the other device, the server sends a connection request to the other device with the global IP/port-tuple of the first device, and the first device receives the global IP/port-tuple of the other device from the server. Then, the two devices will simultaneously start a connection towards each other, which will look like outgoing traffic for the respective NAT:s.

Other approaches for NAT traversal relying on some kind of heartbeat signal to keep an outbound connection alive also exist. Using keep alive signaling is power consuming and results in signaling overhead, which is unnecessarily capacity consuming. The former may be particularly severe for resource constrained devices and/or devices with low power consumption restrictions.

Yet another approach to enable inbound IP traffic for a device subject to NAT comprises sending an SMS message to the device. This pages the device, and the content of the SMS message may, for example, instruct the device to contact a server. However, using SMS messaging only to wake up a device for inbound traffic may be unnecessarily capacity consuming. Furthermore, SMS messaging may not be available in all situations, e.g. in relation to Internet-of-Things (IoT) devices, New Radio, etc.

US 2009/0210519 A1 discloses approaches to facilitate remote wake-up wherein a separate IP address can be used by a target host. However, the solution disclosed therein requires set-up of a particular IP address for wake-up. Therefore, two attach procedures (one for the default IP address and one for the wake-up IP address) need to be performed which is unnecessary complex. Furthermore, the problem of inbound traffic to a device subject to NAT is still not adequately addressed. In addition, the solution of US 2009/0210519 A1 consumes twice as many local IP addresses as conventionally. This may lead to one or more of: potential address exhaustion, more cumbersome collision avoidance, and more cumbersome re-use handling.

Therefore, there is a need for alternative approaches for enabling inbound IP traffic to a communication device subject to NAT.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method of a first communication device, for enabling inbound Internet protocol (IP) traffic to the first communication device, wherein the first communication device has an operator specific device identity related to an operator network and is subject to network address translation (NAT).

The method comprises transmitting, to a server associated with the operator network and with a wake-up server identity, a wake-up registration request.

The method also comprises acquiring, from the server, a wake-up identifier comprising at least a first part and a second part.

Generally throughout this disclosure, the first part is indicative of a wake-up device identity associated with the operator specific device identity of the first communication device and the second part is indicative of the wake-up server identity.

Also generally throughout this disclosure, the wake-up identifier is for triggering a wake-up action of the first communication device, and wherein the wake-up action is for enabling the inbound IP traffic.

In some embodiments, the method further comprises adding a third part to the wake-up identifier, wherein the third part is indicative of an application identity of an application of the first communication device.

In some embodiments, the method further comprises distributing the wake-up identifier to one or more second communication devices unable, due to the NAT, to establish an inbound IP connection to the first communication device.

In some embodiments, the method further comprises receiving a wake-up message based on the operator specific device identity, and performing the wake-up action in response to receiving the wake-up message.

In some embodiments, the wake-up action comprises establishing an outbound IP connection from the first communication device to the operator network to enable the inbound IP traffic.

A second aspect is a method of a server, for enabling inbound Internet protocol (IP) traffic to a first communication device that is subject to network address translation (NAT), wherein the server is associated with an operator network and with a wake-up server identity and is configured to maintain an association between an operator specific device identity of the first communication device and a wake-up device identity.

The method comprises receiving, from the first communication device, a wake-up registration request.

The method also comprises providing, to the first communication device, a wake-up identifier comprising at least a first part and a second part.

The method also comprises storing the association between the operator specific device identity of the first communication device and the wake-up device identity.

In some embodiments, the method further comprises receiving, from a second communication device, a wake-up request message indicative of the wake-up device identity, wherein the second communication device is unable, due to the NAT, to establish an inbound IP connection to the first communication device, determining the operator specific device identity corresponding to the wake-up device identity according to the association, and causing transmission of a wake-up message to the first communication device having the determined operator specific device identity for triggering performance of the wake-up action by the first communication device.

In some embodiments, the wake-up request message is further indicative of an application identity of an application of the first communication device, and the method further comprises causing indication of the application identity in the wake-up message.

In some embodiments, causing the transmission of the wake-up message comprises triggering transmission of the wake-up message from the operator network.

A third aspect is a method of a second communication device, for enabling inbound Internet protocol (IP) traffic to a first communication device that has an operator specific device identity related to an operator network and that is subject to network address translation (NAT), wherein the second communication device is unable, due to the NAT, to establish an inbound IP connection to the first communication device.

The method comprises receiving a wake-up identifier from the first communication device, wherein the wake-up identifier comprises at least a first part and a second part.

In some embodiments, the method further comprises determining, responsive to the second part of the wake-up identifier, a server associated with the operator network and with a wake-up server identity, and transmitting, to the determined server, a wake-up request message indicative of the wake-up device identity of the first communication device.

In some embodiments, the wake-up identifier further comprises a third part indicative of an application identity of an application of the first communication device and the wake-up request message is further indicative of the application identity.

A fourth aspect is a computer program product comprising a non-transitory computer readable medium, having thereon a computer program comprising program instructions. The computer program is loadable into a data processing unit and configured to cause execution of the method according to one or more of the first, second and third aspects when the computer program is run by the data processing unit.

A fifth aspect is an arrangement for a first communication device, for enabling inbound Internet protocol (IP) traffic to the first communication device, wherein the first communication device has an operator specific device identity related to an operator network and is subject to network address translation (NAT).

The arrangement comprises controlling circuitry configured to cause transmission, to a server associated with the operator network and with a wake-up server identity, of a wake-up registration request, and acquisition, from the server, of a wake-up identifier comprising at least a first part and a second part.

In some embodiments, the controlling circuitry is further configured to cause addition of a third part to the wake-up identifier, wherein the third part is indicative of an application identity of an application of the first communication device.

In some embodiments, the controlling circuitry is further configured to cause distribution of the wake-up identifier to one or more second communication devices unable, due to the NAT, to establish an inbound IP connection to the first communication device.

In some embodiments, the controlling circuitry is further configured to cause reception of a wake-up message based on the operator specific device identity, and performance of the wake-up action in response to receiving the wake-up message.

In some embodiments, performance of the wake-up action comprises establishment of an outbound IP connection from the first communication device to the operator network to enable the inbound IP traffic.

A sixth aspect is a wake-up client comprising the arrangement of the fifth aspect.

A seventh aspect is a communication device comprising one or more of the arrangement of the fifth aspect and the wake-up client of the sixth aspect.

An eighth aspect is an arrangement for a server, for enabling inbound Internet protocol (IP) traffic to a first communication device that is subject to network address translation (NAT), wherein the server is associated with an operator network and with a wake-up server identity and is configured to maintain an association between an operator specific device identity of the first communication device and a wake-up device identity.

The arrangement comprises controlling circuitry configured to cause reception, from the first communication device, of a wake-up registration request, provision, to the first communication device, of a wake-up identifier comprising at least a first part and a second part, and storing of the association between the operator specific device identity of the first communication device and the wake-up device identity.

In some embodiments, the controlling circuitry is further configured to cause reception, from a second communication device, of a wake-up request message indicative of the wake-up device identity, wherein the second communication device is unable, due to the NAT, to establish an inbound IP connection to the first communication device, determination of the operator specific device identity corresponding to the wake-up device identity according to the association, and transmission of a wake-up message to the first communication device having the determined operator specific device identity for triggering performance of the wake-up action by the first communication device.

In some embodiments, the wake-up request message is further indicative of an application identity of an application of the first communication device, and the controlling circuitry is further configured to cause indication of the application identity in the wake-up message.

In some embodiments, the controlling circuitry is configured to cause the transmission of the wake-up message by triggering transmission of the wake-up message from the operator network.

A ninth aspect is a server node comprising the arrangement of the eighth aspect.

A tenth aspect is an arrangement for a second communication device, for enabling inbound Internet protocol (IP) traffic to a first communication device that has an operator specific device identity related to an operator network and that is subject to network address translation (NAT), wherein the second communication device is unable, due to the NAT, to establish an inbound IP connection to the first communication device.

The arrangement comprises controlling circuitry configured to cause reception of a wake-up identifier from the first communication device, wherein the wake-up identifier comprises at least a first part and a second part.

In some embodiments, the controlling circuitry is further configured to cause determination, responsive to the second part of the wake-up identifier, of a server associated with the operator network and with a wake-up server identity, and transmission, to the determined server, of a wake-up request message indicative of the wake-up device identity of the first communication device.

In some embodiments, the wake-up identifier further comprises a third part indicative of an application identity of an application of the first communication device and the wake-up request message is further indicative of the application identity.

An eleventh aspect is a communication device comprising the arrangement of the tenth aspect.

In some embodiments, any of the above aspects may additionally have features identical with or corresponding to any of the various features as explained above for any of the other aspects.

An advantage of some embodiments is that inbound IP traffic to a communication device subject to NAT is enabled.

Another advantage of some embodiments is that one or more of the overhead signaling, the capacity consumption and the power consumption is reduced compared to prior art approaches for NAT traversal.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 12 is a flowchart illustrating example method steps implemented in a communication system including a host computer, a base station and a user equipment in accordance with some embodiments;

FIG. 13 is a flowchart illustrating example method steps implemented in a communication system including a host computer, a base station and a user equipment in accordance with some embodiments;

FIG. 14 is a flowchart illustrating example method steps implemented in a communication system including a host computer, a base station and a user equipment in accordance with some embodiments; and FIG. 15 is a flowchart illustrating example method steps implemented in a communication system including a host computer, a base station and a user equipment in accordance with some embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where inbound IP traffic is enabled to a first communication device subject to NAT. The first communication device is the device to be woken up—the wake-up device—and typically comprises a wake-up client for this purpose. In typical embodiments the wake-up client may be implemented in the modem, at non-access stratum (NAS) level in the application stack, of the first communication device and/or may be comprised in the modem of the first communication device.

Figure 1:
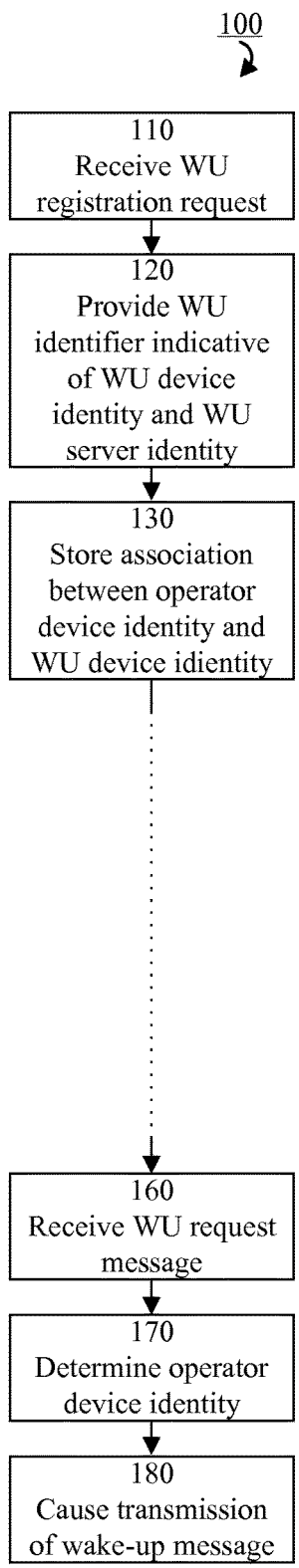
FIG. 1 is a flowchart illustrating example method steps according to some embodiments.
Figure 2:
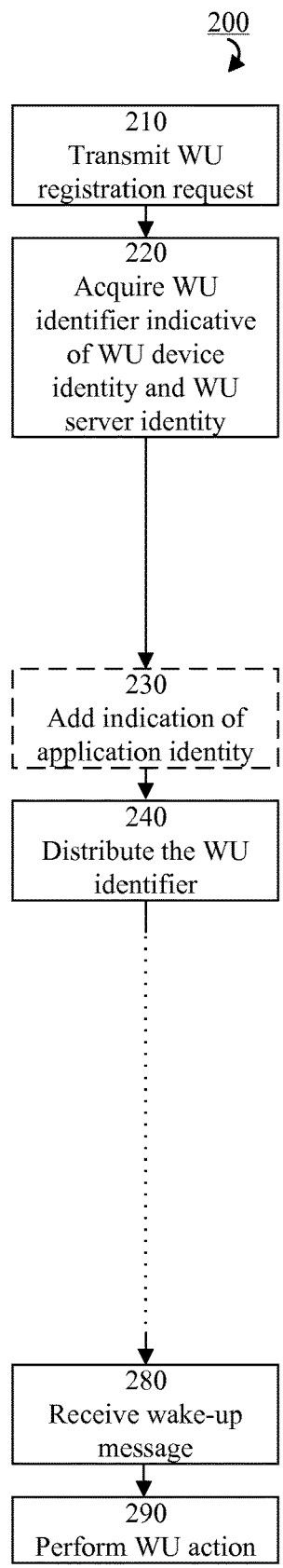
FIG. 2 is a flowchart illustrating example method steps according to some embodiments.
Figure 3:
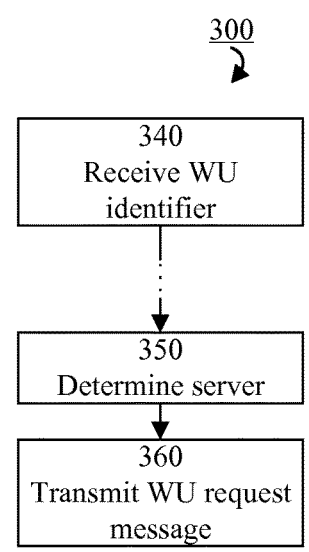
FIG. 3 is a flowchart illustrating example method steps according to some embodiments.

FIGS. 1-3 illustrate example methods 100, 200, 300 according to some embodiments. The method 100 is for a server (a wake-up server, WUS), the method 200 is for the first communication device, and the method 300 is for a second communication device unable, due to the NAT, to establish an inbound IP connection to the first communication device. Typically, the WUS is connected both to the "private network" (the local IP address domain) and to the "public network" (the global IP address domain).

The first communication device has an operator specific device identity related to an operator network. The server is associated with the operator network and with a wake-up server identity and is configured to maintain an association between an operator specific device identity of the first communication device and a wake-up device identity.

The method 200 starts in step 210, where a wake-up (WU) registration request is transmitted to the server, and the method 100 starts in step 110, where the wake-up registration request is received from the first communication device. Typically, the wake-up registration request is indicative of (e.g. comprises) the operator specific device identity.

In step 120 of the method 100, the server provides a wake-up identifier to the first communication device, and in step 220 of the method 200, the first communication device acquires the wake-up identifier (e.g. a wake-up address) from the server.

The wake-up identifier comprises at least a first part and a second part. The first part is indicative of a wake-up device identity associated with the operator specific device identity of the first communication device. The second part is indicative of the wake-up server identity.

The wake-up identifier may, for example, have one of the following compositions:
  part1@part2
  part3.part1@part2
  part1.part3@part2
where part1 (wake-up device identity) identifies the device, part 2 (wake-up server identity, e.g. an endpoint identification) identifies the server, and part 3 (application identity) identifies an application as will be elaborated on later herein. The part3 may, according to some embodiments, include any payload data, alternatively or additionally to the application identity. The part1 may be more elaborative according to some embodiments, and may comprise information about the first communication device (e.g. parts of a medium access control, MAC, address).

An example wake-up identifier may be a combination of a universally unique identifier (UUID4) and a point of contact uniform resource identifier (URI) that points to the public IP of the public interface of the server:
  #UUID4@wakeup.operator.com (where wakeup.operator.com corresponds to part2 and #UUID4 corresponds to part1)
  1d8266ad-002b-4c60-b116-703066faf01c@wakeup.operator.com (where wakeup.operator.com corresponds to part2 and 1d8266ad-002b-4c60-b116-703066faf01c corresponds to part1)
  1d8266ad-002b-4c60-b116-703066faf01c@wakeup.telia.se (where wakeup.operator.com corresponds to part2 and 1d8266ad-002b-4c60-b116-703066faf01c corresponds to part1)

The wake-up identifier is for triggering a wake-up action of the first communication device, and the wake-up action is for enabling the inbound IP traffic.

In step 130 of the method 100, the server stores the association between the operator specific device identity of the first communication device and the wake-up device identity.

In optional step 230 of the method 200, the first communication device adds a third part to the wake-up identifier, wherein the third part is indicative of an application identity of an application of the first communication device.

In step 240 of the method 200, the first communication device distributes the wake-up identifier to one or more second communication devices unable, due to the NAT, to establish an inbound IP connection to the first communication device, and in step 340 of the method 300, the second communication device receives the wake-up identifier. Typically, the distribution is made to devices, which the first communication device wants to be reachable for.

Generally, step 230 may apply to more than one applications of the first communication device. Thus, step 230 may comprise adding a respective third part to the wake-up identifier, wherein the respective third part is indicative of a respective application identity of a corresponding respective application of the first communication device. Thus, a wake-up identifier distributed to one second communication device may have a different third part than a wake-up identifier distributed to a different second communication device.

When the second communication device want to reach the first communication device, it determines, in step 350 of the method 300, a server associated with the operator network and with a wake-up server identity. The determination is made based on the second part of the earlier received wake-up identifier for the first communication device.

In step 360 of the method 300, the second communication device transmits a wake-up request message to the determined server, and in step 160 of the method 100, the server receives the wake-up request message.

The wake-up request message is indicative of the wake-up device identity of the first communication device. The wake-up device identity is determined based on the first part of the earlier received wake-up identifier for the first communication device.

In some embodiments, wherein the wake-up identifier further comprises a third part indicative of an application identity of an application of the first communication device, the wake-up request message of step 360 may be further indicative of an application identity.

In step 170 of the method 100, the server determines the operator specific device identity corresponding to the wake-up device identity according to the stored association.

In step 180 of the method 100, the server causes transmission of a wake-up message to the first communication device having the determined operator specific device identity for triggering performance of the wake-up action by the first communication device.

In some embodiments, causing the transmission of the wake-up message may, for example, comprise triggering transmission of the wake-up message (e.g. a paging message) from the operator network.

In some embodiments, causing the transmission of the wake-up message may comprise the operator queueing a message in the existing IP buffer to trigger a wake-up to the device. The message is sent to a pre-defined port and the message format is also pre-defined so that the device can interpret it.

In some embodiments, the wake-up message may comprise a legacy paging message of the operator network, or a specific paging message for the purpose of waking up devices such as the first communication device (e.g. IoT-devices).

In some embodiment, the wake-up message may comprise two or more messages, e.g. a paging message and, subsequently, a follow-up message comprising additional information. The follow-up message may, for example, be a NAS message in accordance with legacy 3GPP (Third Generation Partnership Project) specifications, indicative of an application identity.

Generally, the wake-up message may, for example, be a paging message or any other message for waking up the first communication device.

In some embodiments, wherein the wake-up request message is indicative of an application identity of an application of the first communication device, step 180 may also comprise causing indication of the application identity in the wake-up message.

In step 280 of the method 200, the wake-up message based on the operator specific device identity is received by the first communication device, and in step 290 of the method 200, the first communication device performs the wake-up action in response to receiving the wake-up message.

The wake-up action can be any action that enables inbound IP traffic. Typically, the wake-up action may comprise establishing an outbound IP connection from the first communication device to the operator network to enable the inbound IP traffic. Examples of wake-up actions include—in response to instructions in the wake-up message—contacting a server for further instructions, performing a "call home" action, checking an inbound traffic buffer in the operator network for push messages bound for the first communication device, performing some measurements or analysis, etc.

When the wake-up message includes an indication of an application identity (e.g. in a follow-up message as exemplified above), the wake-up action may be performed in relation to the application, e.g. connecting to an account associated with the application.

In typical embodiments, the application identities are not stored by the server, but may be seen as pure payload from the server perspective. In such typical embodiments, the application identity is added by the first communication device (step 230) for distribution to the second communication device (steps 240 and 340), the application identity is included in the wake-up request message from the second communication device to the server (steps 340 and 140), and the application identity is just transferred by the server from the wake-up request message to the wake-up message to be transmitted to the first communication device (steps 180 and 280). Thus, the server does not have any knowledge of the application identity in these embodiments, and handles it as any payload of the wake-up request message and the wake-up message.

The second communication device may be aware of that the application identity defines an application of the first communication device (e.g. if the second communication device is configured to select among several applications of the first communication device in connection with transmitting the wake-up request message). An example could be that the second communication device may be allowed to choose between sending temperature data and sending humidity data, in which case two wake-up identifiers of the form part3.UUID4@telia.com could be distributed to the second communication device as temperature.UUID4@telia.com and humidity.UUID4@telia.com.

Alternatively, the second communication device may be unaware of the meaning of the application identity (e.g. if the application identity is provided to the second communication device due to the second communication device being specifically configured to operate in association with a particular application of the first communication device). In these embodiments, the application identity does not comprise any information to the used by the second communication device, but it is typically entirely up to the first communication device to distribute the application identity with the wake-up identifier to define the purpose (application) for with it wants to be woken up.

According to some embodiments, the (indication of the) application identity in the wake-up identifier and/or in the wake-up request message and/or in the wake-up message may be interpretable only to the first communication device (e.g. may be randomly generated by the first communication device). An advantage with this approach is increased security, since interception of the combined identities of application and wake-up device may be avoided, thereby mitigating attempts from a hacker to trigger responses from the first communication device.

It should be noted that, typically, the wake-up action is completely under control of the first communication device (the wake-up client).

In some embodiments, the wake-up identifier may be temporary (e.g. may only be valid during a specified period of time and/or for a specified number of wake-up requests). In such (and other) embodiments, the wake-up registration and distribution (steps 110, 210, 120, 220, 130, 230, 24, 340) may be repeated as necessary.

Figure 4:
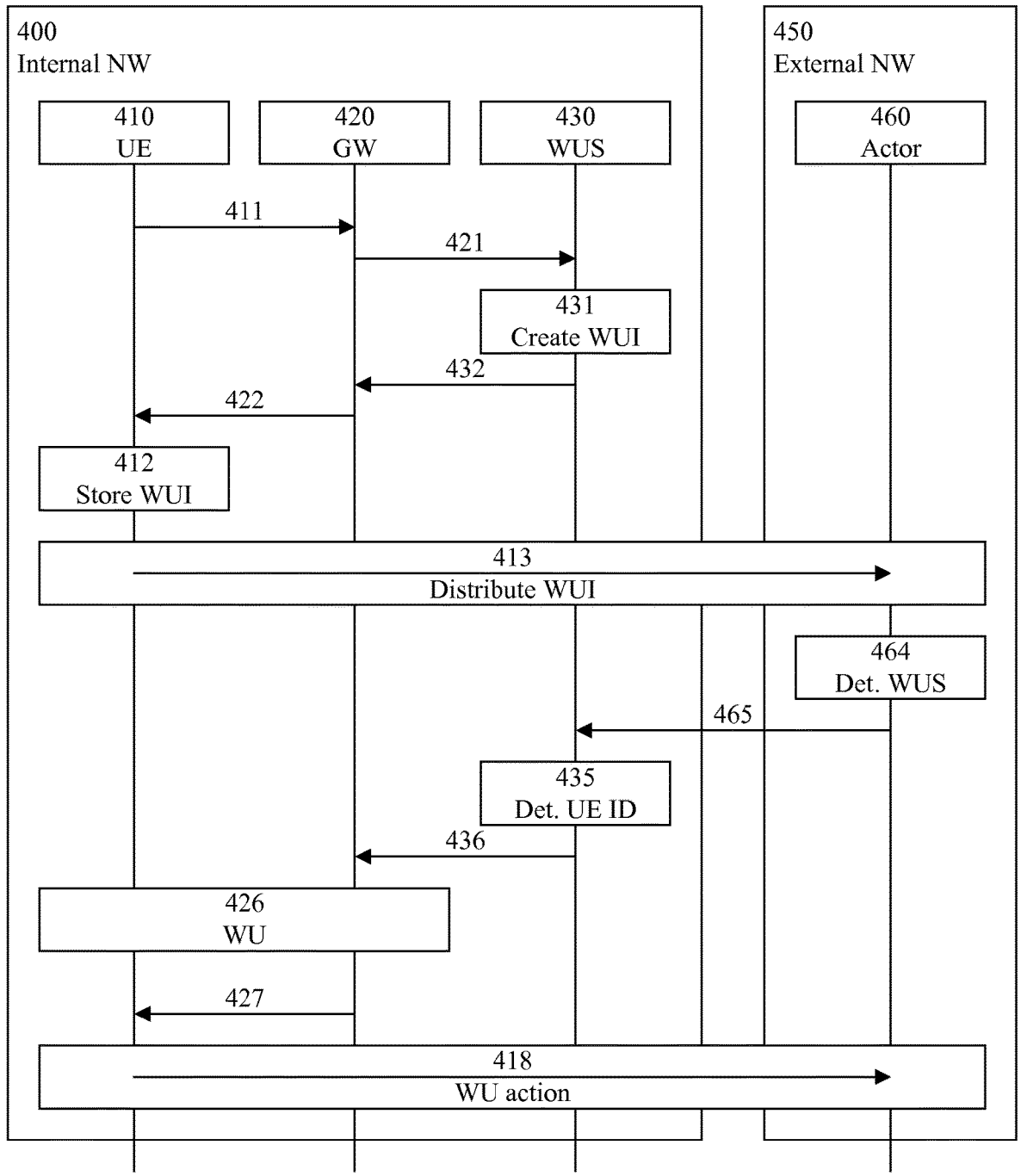
FIG. 4 is a signaling diagram illustrating example signaling according to some embodiments.

FIG. 4 is a signaling diagram illustrating example signaling according to some embodiments. For example, the signaling diagram of FIG. 4 may be combined with one or more of the methods of FIGS. 1-3.

A server (WUS) 430, a first communication device (UE) 410 and a gateway (GW) 420 are comprised in an internal network (the operator network) 400. The gateway can be any suitable relaying function. Typically, the gateway may comprise a base station (e.g. eNB) of the operator network, and possibly other network nodes such as a mobility management entity (MME) and/or a serving gateway (SGW).

A second communication device (Actor) 460 unable, due to the NAT, to establish an inbound IP connection to the first communication device, is comprised in an external network 450 (e.g. the Internet or other could-based application). It should be noted that the actor can be any type of device unable, due to the NAT, to establish an inbound IP connection to the first communication device.

The UE sends a wake-up (WU) registration request 411 comprising its operator specific device identity to the GW which relays the wake-up (WU) registration request 421 to the WUS (compare with steps 110 and 210).

The wake-up registration request 411 may, for example, be comprised in an attach request preceded by a radio resource control (RRC) connection request. The attach request may be transmitted from a modem of the UE to an eNB of the GW and relayed to an MME of the GW. In response thereto, the GW may transmit a create session request to an SGW of the GW, and the SGW may in turn transmit a register device request to the WUS, corresponding to the wake-up registration request 421.

The WUS creates, 431, a wake-up identifier (WUI) and stores a mapping between the operator specific device identity and a wake-up device identity (compare with steps 120 and 130). The WUI is indicative (e.g. comprises) the wake-up device identity and a wake-up server identity.

The WUI is provided to the UE. Typically, the WUS may transmit the WUI in a WU registration confirmation message 432 to the GW which relays the WU registration confirmation message 422 to the UE, where the WUI is stored 412 (compare with steps 120 and 220). The wake-up registration confirmation message 432 may, for example, be comprised in a register device accept from the WUS to a SGW of the GW, which in response thereto may transmit a create session response to a MME of the GW. The MME may include the WUI in an attach accept message sent to an eNB of the GW, which transmits the attach accept message to the UE, corresponding to the wake-up registration confirmation message 422.

The UE distributes, 413, the WUI to one or more actors (compare with steps 240 and 340). In the association with the distribution of the WUI, the UE may also exchange messages internally between an application function and the modem. Such internal messages may comprise the application function sending a wake-up status request to the modem, which responds with a wake-up status response. If the response indicates that the wake-up status is enabled, the application function may initiate the WUI distribution. Alternatively or additionally, the WUI distribution may be handled by the modem.

In some embodiments, an application of the first communication device can request WUI from the WUC (wake-up client) of the first communication device, and the WUC may create a new unique WUI by prepending a new part3 to part1 and part2, storing the mapping between part3 and the application and sending that new WUI back to the application. The application may then distribute this WUI in step 413. As mentioned before, part3 is typically created entirely by and the first communication device and the WUS just experiences part3 as payload which is passed on by the WUS as explained herein.

When the actor wants to reach the UE, it determines 464 the WUS based in the wake-up server identity of the WUI distributed by the UE (compare with step 350), and transmits a wake-up request message 465 indicative of the wake-up device identity of the WUI distributed by the UE to the WUS (compare with steps 360 and 160).

The WUS determines 435 (e.g. by mapping) the operator specific device identity (UE ID) corresponding to the wake-up device identity according to the stored association (compare with step 170).

Then, the WUS sends a wake-up request 436 to the gateway, and the gateway initiates 426 the process for waking up the UE by transmission of a wake-up message 427 to the UE (compare with steps 180 and 280).

In response to receiving the wake-up message 427, the UE performs a wake-up action in 418 (compare with step 290) that enables inbound IP traffic.

The wake-up may, for example, be initiated from an MME of the GW, which has received the wake-up request from a SGW of the GW. As for the wake-up action, a random access procedure between the eNB and the modem of the UE may be followed by an RRC connection request message from the modem of the UE to the eNB and a service request message from the modem of the UE to the MME. The MME may send a wakeup request in response thereto and the modem of the UE may notify an application function of the UE in a wake-up indication message and transmit a wake-up accept message to the MME which is relayed to the WUS via the SGW.

Figure 5:
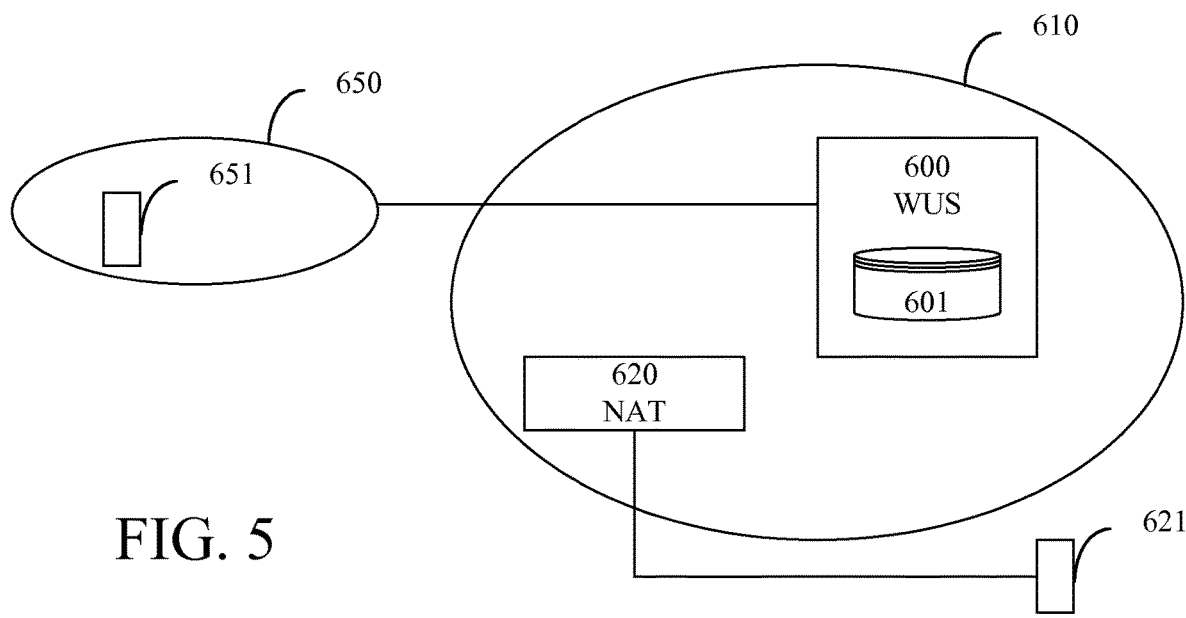
FIG. 5 is a schematic drawing illustrating an example scenario according to some embodiments.

FIG. 5 schematically illustrates an example scenario where some embodiments may be applicable. This scenario comprises the first communication device 621 which is subject to a NAT 620 of an operator network 610. The operator network comprises a wake-up server (WUS) 600 having a register 601 of associations between operator specific device identifiers and wake-up device identifiers. A second communication device 651 resides in association with the Internet 650 and is unable, due to the NAT, to establish an inbound IP connection to the first communication device.

Figure 6:
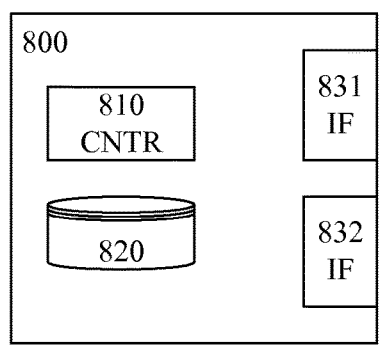
FIG. 6 is a schematic block diagram illustrating an example arrangement according to some embodiments.

FIG. 6 is a schematic block diagram illustrating an example arrangement 800 for a server or a server node according to some embodiments. The arrangement is for enabling inbound IP traffic to a first communication device that is subject to NAT, wherein the server is associated with an operator network and with a wake-up server identity and is configured to maintain an association between an operator specific device identity of the first communication device and a wake-up device identity. For example, the arrangement 800 may be configured to cause performance steps in accordance with any of the FIGS. 1 and 4.

The arrangement comprises controlling circuitry (CNTR, e.g. a controller) 810 configured to cause execution of the method steps described in connection with FIG. 1.

The controlling circuitry may be associated with interface circuitry (IF) 831 configured to receive the wake-up registration request from the first communication device and to provide the wake-up identifier to the first communication device.

The controlling circuitry may also be associated with storing circuitry 820 configured to store the association between the operator specific device identity of the first communication device and the wake-up device identity.

The controlling circuitry may be further associated with interface circuitry (IF) 832 configured to receive the wake-up request message from a second communication device.

The interface circuitry (IF) 831 may be further configured to cause transmission of the wake-up message to the first communication device.

Figure 7:
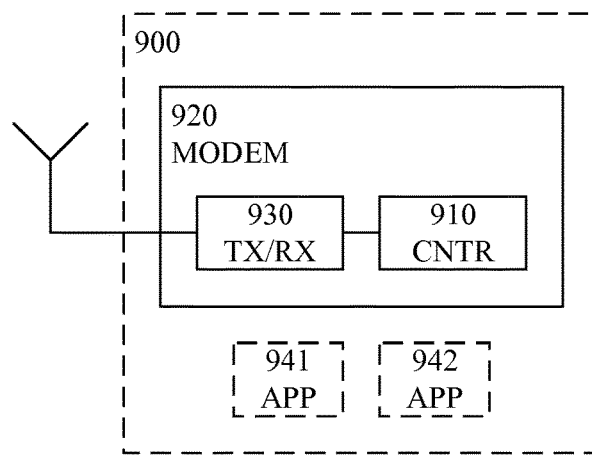
FIG. 7 is a schematic block diagram illustrating an example arrangement according to some embodiments.

FIG. 7 is a schematic block diagram illustrating an example arrangement 900 for a (first) communicating device or a wake-up client comprised in a (first) communicating device according to some embodiments. The arrangement is for enabling inbound IP traffic to the first communication device that is subject to NAT. For example, the arrangement 900 may be configured to cause performance steps in accordance with any of the FIGS. 2 and 4.

The arrangement comprises controlling circuitry (CNTR, e.g. a controller) 910 configured to cause execution of the method steps described in connection with FIG. 2. The controlling circuitry may typically be comprised in a modem 920 of the (first) communication device.

The controlling circuitry may be associated with transceiving circuitry (TX/RX) 930 configured to transmit the wake-up registration request to a server associated with an operator network, to acquire the wake-up identifier from the server, and to participate in the distribution of the wake-up identifier. The transceiving circuitry 930 may also be configured to receive the wake-up message based on the operator specific device identity, and participate in performance of the wake-up action in response to receiving the wake-up message.

In some embodiments, the controlling circuitry may be associated with one or more applications (APP) 941, 942, an identification of which may be added as a third part of the wake-up identifier.

Figure 8:
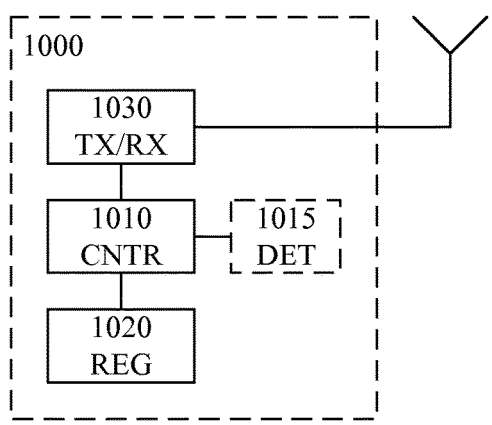
FIG. 8 is a schematic block diagram illustrating an example arrangement according to some embodiments.

FIG. 8 is a schematic block diagram illustrating an example arrangement 1000 for a (second) communicating device according to some embodiments. The arrangement is for enabling inbound IP traffic to the first communication device that is subject to NAT. For example, the arrangement 1000 may be configured to cause performance steps in accordance with any of the FIGS. 3 and 4.

The arrangement comprises controlling circuitry (CNTR, e.g. a controller) 1010 configured to cause execution of the method steps described in connection with FIG. 1.

The controlling circuitry may be associated with transceiving circuitry (TX/RX) 1030 configured to receive the wake-up identifier from the first communication device, and to transmit the wake-up request message to the server.

The controlling circuitry may also be associated with (e.g. comprise) determination circuitry (DET) 1015 configured to determine the server based on the second part of the wake-up identifier In some embodiments, the second communicating device may be a wireless communication device as illustrated in FIG. 8.

In some embodiments, the second communicating device may be a server (e.g. wired to the Internet). In such embodiments, the transceiving circuitry configured to receive the wake-up identifier from the first communication device may comprise a wired interface, for example.

To further exemplify, a globally routable device wakeup service is provided according to some embodiments. By using a globally routable wake-up address (wake-up identifier), external entities (second communication devices) that have been provided with the wake-up address can request the first communication device to wake up through an operator wakeup service endpoint (wake-up server).

In a cellular network, the network may page the first communication device. In an Ethernet network, the router may trigger a Wake on Lan (WoL) for the first communication device. All such types of messages that trigger the first communication device to perform a wake-up action are intended to be comprised in the term wake-up message.

It is up to the first communication device to act on this wake-up message. Typically, the first communication device might contact some predefined server to check for messages or perform any other suitable wake-up action.

Introducing wake-up signaling according to the approaches herein makes it unnecessary to maintain keep alive signaling as needed in the prior art. This will significantly reduce the power consumption by maximizing the amount of time that a device can sleep while only monitoring wake-up messages (wake-up signals).

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a server node.

Embodiments may appear within an electronic apparatus (such as a wireless communication device or a server node) comprising arrangements, circuitry, and/or logic according to any of the embodiments described herein. Alternatively or additionally, an electronic apparatus (such as a wireless communication device or a server node) may be configured to perform methods according to any of the embodiments described herein.

Figure 9:
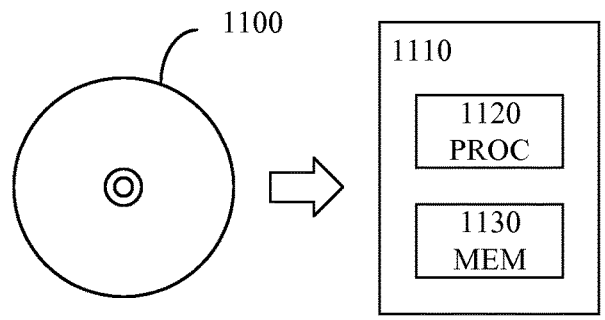
FIG. 9 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 9 illustrates an example computer readable medium in the form of a compact disc (CD) ROM 900. The computer readable medium has stored thereon a computer program comprising program instructions. The computer program is loadable into a data processor (PROC) 920, which may, for example, be comprised in a wireless communication device or a server node 910. When loaded into the data processing unit, the computer program may be stored in a memory (MEM) 930 associated with or comprised in the data-processing unit. According to some embodiments, the computer program may, when loaded into and run by the data processing unit, cause execution of method steps according to, for example, any of the methods illustrated in FIGS. 1-3 or otherwise described herein.

Figure 10:
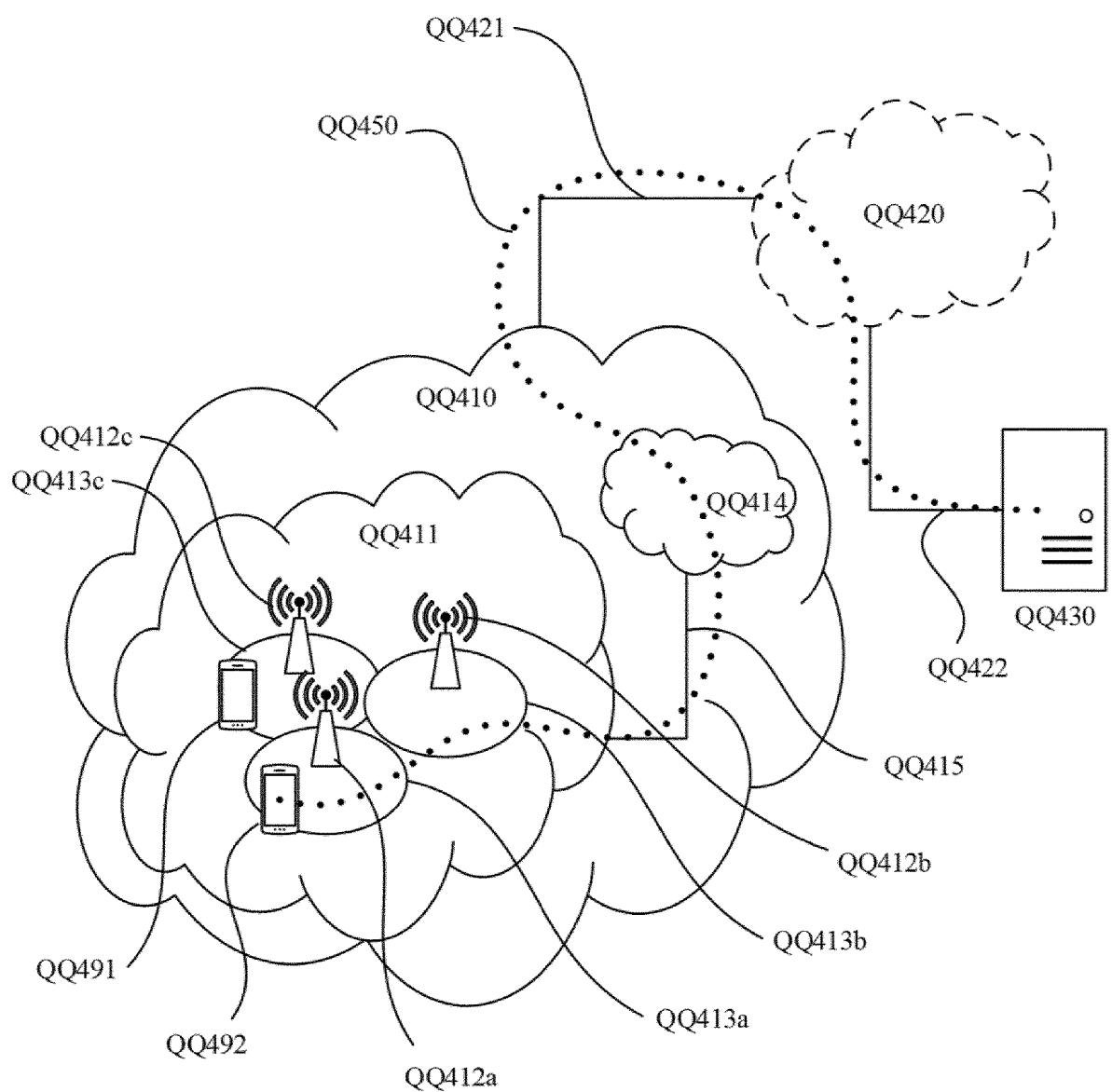
FIG. 10 illustrates a telecommunication network connected via an intermediate network to a host computer in accordance with some embodiments.

With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries.

OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 11:
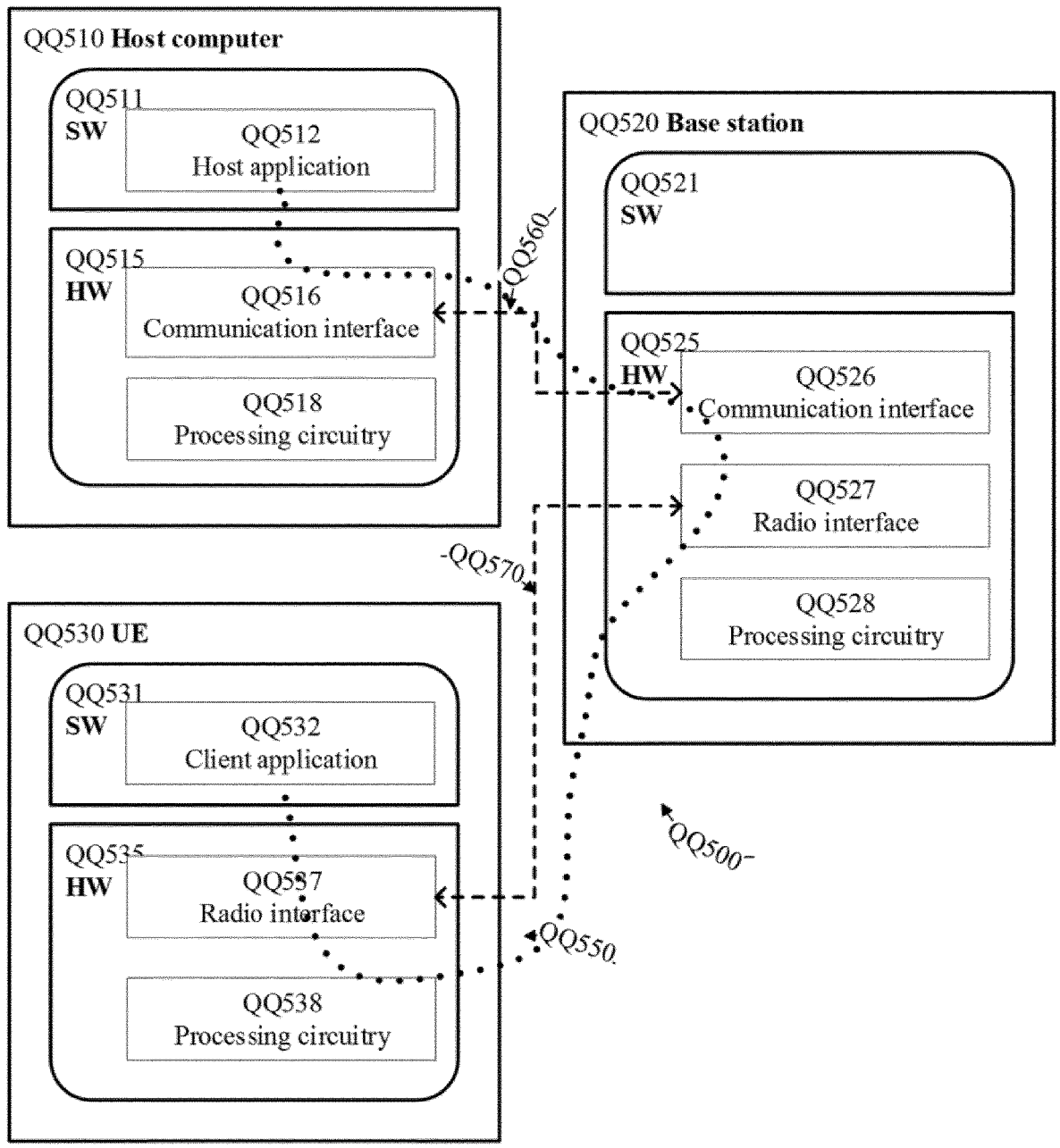
FIG. 11 illustrates a host computer communicating via a base station with a user equipment over a partially wireless connection in accordance with some embodiments.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may provide benefits and improvements such as one or more of: accessibility to a device subject to NAT, decreased complexity, decreased power consumption, and decreased signaling overhead.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method performed by a wireless device for enabling inbound Internet protocol, IP, traffic to a first communication device subject to network address translation, NAT, the method comprising:
transmitting, to a server associated with the operator network and with a wake-up server identity, a wake-up registration request; and acquiring, from the server, a wake-up identifier comprising at least a first part and a second part, wherein the first part is indicative of a wake-up device identity associated with the operator specific device identity of the first communication device and the second part is indicative of the wake-up server identity, wherein the wake-up identifier is for triggering a wake-up action of the first communication device, and wherein the wake-up action is for enabling the inbound IP traffic.

A2. The method of any of the previous embodiments in Group A, further comprising:
providing user data; and
forwarding the user data to a host computer via the transmission to the base station.

Group B Embodiments

B1. A method performed by a base station for enabling inbound Internet protocol, IP, traffic to a first communication device subject to network address translation, NAT, the method comprising:
relaying, from the first communication device to a server associated with the operator network and with a wake-up server identity, a wake-up registration request; and
relaying, from the server to the first communication device, a wake-up identifier comprising at least a first part and a second part, wherein the first part is indicative of a wake-up device identity associated with the operator specific device identity of the first communication device and the second part is indicative of the wake-up server identity, wherein the wake-up identifier is for triggering a wake-up action of the first communication device, and wherein the wake-up action is for enabling the inbound IP traffic.

B2. The method of any of the previous embodiments in Group B, further comprising:
obtaining user data; and
forwarding the user data to a host computer or a wireless device.

Group C Embodiments

C1. A wireless device for enabling inbound Internet protocol, IP, traffic to a first communication device subject to network address translation, NAT, the wireless device comprising:
processing circuitry configured to perform any of the steps of any of the Group A embodiments; and
power supply circuitry configured to supply power to the wireless device.

C2. A base station for enabling inbound Internet protocol, IP, traffic to a first communication device subject to network address translation, NAT, the base station comprising:
processing circuitry configured to perform any of the steps of any of the Group B embodiments;
power supply circuitry configured to supply power to the base station.

C3. A user equipment (UE) for enabling inbound Internet protocol, IP, traffic to a first communication device subject to network address translation, NAT, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
the processing circuitry of the host computer is configured to execute a host application; and
the UE's processing circuitry is configured to execute a client application associated with the host application, thereby providing the user data.

D18. The communication system of any of embodiments D14 through D17, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:
1. A method of a first communication device, for enabling inbound Internet protocol (IP) traffic to the first communication device, wherein the first communication device has an operator specific device identity related to an operator network and is subject to network address translation (NAT), the method comprising:
- transmitting, to a server associated with the operator network and with a wake-up server identity, a wake-up registration request;
- acquiring, from the server, a wake-up identifier comprising at least a first part and a second part, wherein the first part is indicative of a wake-up device identity associated with the operator specific device identity of the first communication device and the second part is indicative of the wake-up server identity, wherein the wake-up identifier is for triggering a wake-up action of the first communication device, and wherein the wake-up action is for enabling the inbound IP traffic; and
- distributing the wake-up identifier to one or more second communication devices unable, due to the NAT, to establish an inbound IP connection to the first communication device.

2. The method of claim 1, further comprising adding a third part to the wake-up identifier, wherein the third part is indicative of an application identity of an application of the first communication device.

3. The method of claim 1, further comprising:
- receiving a wake-up message based on the operator specific device identity; and
- performing the wake-up action in response to receiving the wake-up message.

4. The method of claim 1, wherein the wake-up action comprises establishing an outbound IP connection from the first communication device to the operator network to enable the inbound IP traffic.

5. A method of a server, for enabling inbound Internet protocol (IP) traffic to a first communication device that is subject to network address translation (NAT), wherein the server is associated with an operator network and with a wake-up server identity and is configured to maintain an association between an operator specific device identity of the first communication device and a wake-up device identity, the method comprising:
- receiving, from the first communication device, a wake-up registration request;
- providing, to the first communication device, a wake-up identifier comprising at least a first part and a second part, wherein the first part is indicative of a wake-up device identity and the second part is indicative of the wake-up server identity, wherein the wake-up identifier is for triggering a wake-up action of the first communication device, and wherein the wake-up action is for enabling the inbound IP traffic;
- storing the association between the operator specific device identity of the first communication device and the wake-up device identity;
- receiving, from a second communication device, a wake-up request message indicative of the wake-up device identity, wherein the second communication device is unable, due to the NAT, to establish an inbound IP connection to the first communication device;
- determining the operator specific device identity corresponding to the wake-up device identity according to the association; and
- causing transmission of a wake-up message to the first communication device having the determined operator specific device identity for triggering performance of the wake-up action by the first communication device.

6. The method of claim 5, wherein the wake-up request message is further indicative of an application identity of an application of the first communication device, the method further comprising causing indication of the application identity in the wake-up message.

7. The method of claim 5, wherein causing the transmission of the wake-up message comprises triggering transmission of the wake-up message from the operator network.

8. A method of a second communication device, for enabling inbound Internet protocol (IP) traffic to a first communication device that has an operator specific device identity related to an operator network and that is subject to network address translation (NAT), wherein the second communication device is unable, due to the NAT, to establish an inbound IP connection to the first communication device, the method comprising:
- receiving a wake-up identifier from the first communication device, wherein the wake-up identifier comprises at least a first part and a second part, wherein the first part is indicative of a wake-up device identity associated with the operator specific device identity of the first communication device and the second part is indicative of a wake-up server identity, wherein the wake-up identifier is for triggering a wake-up action of the first communication device, and wherein the wake-up action is for enabling the inbound IP traffic;
- determining, responsive to the second part of the wake-up identifier, a server associated with the operator network and with the wake-up server identity; and
- transmitting, to the determined server, a wake-up request message indicative of the wake-up device identity of the first communication device.

9. The method of claim 8, wherein the wake-up identifier further comprises a third part indicative of an application identity of an application of the first communication device and wherein the wake-up request message is further indicative of the application identity.

10. A non-transitory computer readable medium, having thereon a computer program comprising program instructions, the computer program being loadable into a data processing unit and configured to cause execution of a method when the computer program is run by the data processing unit, wherein the method is of a first communication device, for enabling inbound Internet protocol (IP) traffic to the first communication device, wherein the first communication device has an operator specific device identity related to an operator network and is subject to network address translation (NAT), the method comprising:
- transmitting, to a server associated with the operator network and with a wake-up server identity, a wake-up registration request;
- acquiring, from the server, a wake-up identifier comprising at least a first part and a second part, wherein the first part is indicative of a wake-up device identity associated with the operator specific device identity of the first communication device and the second part is indicative of the wake-up server identity, wherein the wake-up identifier is for triggering a wake-up action of the first communication device, and wherein the wake-up action is for enabling the inbound IP traffic; and
- distributing the wake-up identifier to one or more second communication devices unable, due to the NAT, to establish an inbound IP connection to the first communication device.

11. An arrangement for a first communication device, for enabling inbound Internet protocol (IP) traffic to the first communication device, wherein the first communication device has an operator specific device identity related to an operator network and is subject to network address translation (NAT), the arrangement comprising controlling circuitry configured to cause:

transmission, to a server associated with the operator network and with a wake-up server identity, of a wake-up registration request;

acquisition, from the server, of a wake-up identifier comprising at least a first part and a second part, wherein the first part is indicative of a wake-up device identity associated with the operator specific device identity of the first communication device and the second part is indicative of the wake-up server identity, wherein the wake-up identifier is for triggering a wake-up action of the first communication device, and wherein the wake-up action is for enabling the inbound IP traffic; and distribution of the wake-up identifier to one or more second communication devices unable, due to the NAT, to establish an inbound IP connection to the first communication device.

12. The arrangement of claim 11, wherein the controlling circuitry is further configured to cause addition of a third part to the wake-up identifier, wherein the third part is indicative of an application identity of an application of the first communication device.

13. The arrangement of claim 11, wherein the controlling circuitry is further configured to cause:

reception of a wake-up message based on the operator specific device identity; and performance of the wake-up action in response to receiving the wake-up message.

14. The arrangement of claim 11, wherein performance of the wake-up action comprises establishment of an outbound IP connection from the first communication device to the operator network to enable the inbound IP traffic.

15. A wake-up client comprising the arrangement of claim 11.

16. A communication device comprising the arrangement of claim 11 and a wake-up client.

17. An arrangement for a server, for enabling inbound Internet protocol (IP) traffic to a first communication device that is subject to network address translation (NAT), wherein the server is associated with an operator network and with a wake-up server identity and is configured to maintain an association between an operator specific device identity of the first communication device and a wake-up device identity, the arrangement comprising controlling circuitry configured to cause:

reception, from the first communication device, of a wake-up registration request;

provision, to the first communication device, of a wake-up identifier comprising at least a first part and a second part, wherein the first part is indicative of a wake-up device identity and the second part is indicative of the wake-up server identity, wherein the wake-up identifier is for triggering a wake-up action of the first communication device, and wherein the wake-up action is for enabling the inbound IP traffic;

storing of the association between the operator specific device identity of the first communication device and the wake-up device identity;

reception, from a second communication device, of a wake-up request message indicative of the wake-up device identity, wherein the second communication device is unable, due to the NAT, to establish an inbound IP connection to the first communication device;

determination of the operator specific device identity corresponding to the wake-up device identity according to the association; and transmission of a wake-up message to the first communication device having the determined operator specific device identity for triggering performance of the wake-up action by the first communication device.

18. The arrangement of claim 17, wherein the wake-up request message is further indicative of an application identity of an application of the first communication device, and wherein the controlling circuitry is further configured to cause indication of the application identity in the wake-up message.

19. The arrangement of claim 17, wherein the controlling circuitry is configured to cause the transmission of the wake-up message by triggering transmission of the wake-up message from the operator network.

20. A server node comprising the arrangement of claim 17.

21. An arrangement for a second communication device, for enabling inbound Internet protocol (IP) traffic to a first communication device that has an operator specific device identity related to an operator network and that is subject to network address translation (NAT), wherein the second communication device is unable, due to the NAT, to establish an inbound IP connection to the first communication device, the arrangement comprising controlling circuitry configured to cause:

reception of a wake-up identifier from the first communication device, wherein the wake-up identifier comprises at least a first part and a second part, wherein the first part is indicative of a wake-up device identity associated with the operator specific device identity of the first communication device and the second part is indicative of a wake-up server identity, wherein the wake-up identifier is for triggering a wake-up action of the first communication device, and wherein the wake-up action is for enabling the inbound IP traffic;

determination, responsive to the second part of the wake-up identifier, of a server associated with the operator network and with the wake-up server identity; and transmission, to the determined server, of a wake-up request message indicative of the wake-up device identity of the first communication device.

22. The arrangement of claim 21, wherein the wake-up identifier further comprises a third part indicative of an application identity of an application of the first communication device and wherein the wake-up request message is further indicative of the application identity.

23. A communication device comprising the arrangement of claim 21.

\* \* \* \* \*